(12) United States Patent
Curry

(10) Patent No.: US 6,571,743 B1
(45) Date of Patent: Jun. 3, 2003

(54) REMOTE CONTROL BALL EJECTOR

(76) Inventor: Wayne Curry, 11303 183rd Ave. NW., Rochester, WA (US) 98579

( * ) Notice: Subject to any disclaimer, the term of this patent is extended or adjusted under 35 U.S.C. 154(b) by 0 days.

(21) Appl. No.: 10/109,763

(22) Filed: Mar. 29, 2002

(51) Int. Cl.[7] .......................... A01K 15/02; A01K 15/04
(52) U.S. Cl. ....................................... 119/720; 119/712
(58) Field of Search ................................. 119/905, 712, 119/720; 124/80, 31, 34, 37, 41.1, 83, 85

(56) References Cited

U.S. PATENT DOCUMENTS

| | | | | |
|---|---|---|---|---|
| 4,205,651 A | * | 6/1980 | Lante-Montefeltro Della Rovere | 124/1 |
| 4,508,093 A | * | 4/1985 | Bertini | 124/1 |
| 5,243,957 A | * | 9/1993 | Neilson | 124/88 |

* cited by examiner

Primary Examiner—Charles T. Jordan
Assistant Examiner—Judith A. Nelson
(74) Attorney, Agent, or Firm—Thomas W. Secrest

(57) ABSTRACT

There is a training device to train dogs to recongnize an object with a distinctive odor such as a drug like marijuana, heroine, cocaine, and the like. An object with a distinctive odor can be placed in a position that the dog cannot touch or contact the object. Then, the dog is allowed to sniff around the object and if the dog recognizes the object with the distinctive odor the dog demonstrates such recognition. The trainer, at a position remote from the dog and also from the object, can release the object so that it will be available to the dog and the dog can put the object in the dog's mouth or play with the object. The release of the object is a reward to the dog for the dog recognizing the distinctive odor. In this manner, the dog can be trained to recognize an object with the distinctive odor. The distinctive odor may be a drug such as marijuane, cocaine, heroine, or may be another distinctive odor such as the odor of an individual or human being on a search and rescue party.

8 Claims, 5 Drawing Sheets

REMOTE CONTROL BALL EJECTOR

CROSS-REFERENCES TO RELATED PATENT APPLICATIONS (IF ANY)

There is no co-pending utility patent application. There may be a co-pending design patent application.

STATEMENT AS TO RIGHTS TO INVENTIONS MADE UNDER FEDERALLY SPONSORED RESEARCH AND DEVELOPMENT (IF ANY)

This invention was developed with private funds and there was no federally assisted fund.

REFERENCE TO A "MICROFICHE APPENDIX"

This section is not applicable to this subject matter.

BACKGROUND OF THE INVENTION

1. Field of the Invention

The genesis of this invention is the training of a dog to sniff a package or an object. A dog may sniff a package or object to determine if there be an undesirable material such as marijuana or cocaine or heroine or other material such as gun powder to name a few to be present. In addition to these materials a dog may be asked to sniff a package or an object to determine if it be a clothing of an individual subject to search and rescue or may be certain foods.

One of the ways of training a dog to sniff a package or an object and to identify the object as having a certain material is for the trainer to place such an object as a ball in a container. The ball may or may not have the undesirable material. For example, say that there are six containers and three of the containers have such an object with a certain odor or characteristic and three of the containers do not have an object with the certain odor or characteristic. The dog goes to the first container and sniffs the container. If the object or ball does not have that undesirable material or material to be identified the dog will go to the second container. Assume that the second container has the material to be identified. The dog sniffs the second container and recognizes the odor and continues to sniff and may use the paws to scrape the container thereby indicating that the dog recognizes the odor.

The trainer to reward the dog removes said object or ball from the container and lets the dog have the object or the ball. Certain dogs like to hold object or ball in the mouth.

Prior to this invention the trainer would go to the container and remove the ball and give it to the dog. I consider one of the undesirable aspects of this procedure is that the dog associates such an object with the trainer and does not associate, only, the object or ball with the material to be recognized.

In order to divorce the situation whereby the dog associates the ball or such an object with the trainer I have invented the subject invention.

(2) Description of Related Art Including Information Disclosed Under 37 CFR 1.97 and 37 CFR 1.98

The applicant does not know of related prior art.

BRIEF SUMMARY OF THE INVENTION

The invention comprises a container for said object or the ball. There is a movable plunger barrier for restricting the movement of said object and/or said ball from the container. There is mechanical mechanism and electric circuitry for moving the plunger barrier to allow said object or said ball to move from the container so that the dog can bite into said object or said ball and receive the reward or be able to mouth said object and/or ball and or paw said object and said ball. The plunger is controlled from a remote position and the trainer is not near the plunger barrier and is not near the dog and/or said object and/or said ball. In this way the dog does not associate the ball with the trainer. The dog associates the ball or said object on its own and free of the trainer.

BRIEF DESCRIPTION OF THE SEVERAL VIEWS OF THE DRAWING(S)

With respect to the drawings it is seen that:

DETAILED DESCRIPTION OF THE INVENTION

Figure 1:
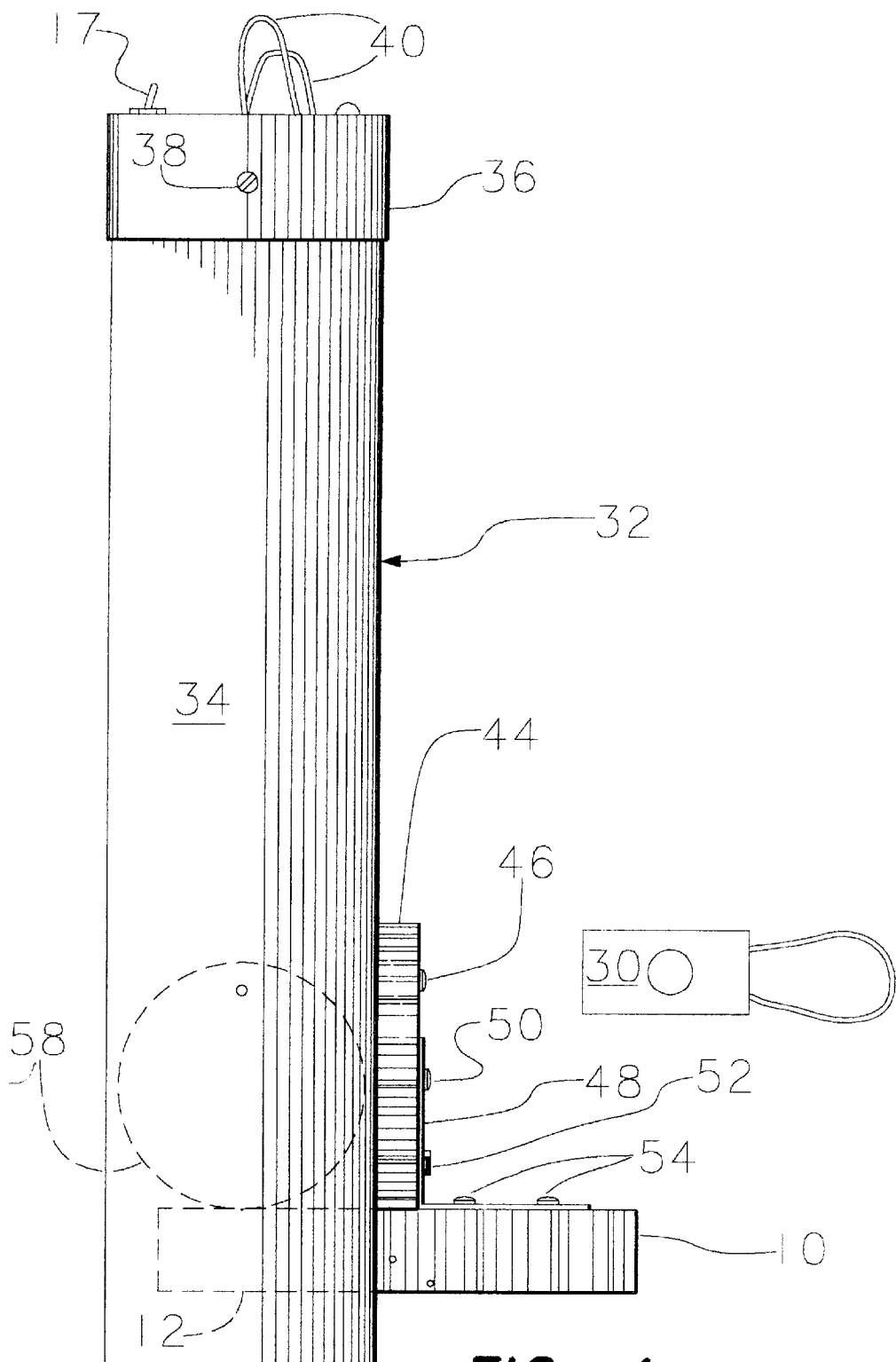
FIG. 1 is a side elevational view of the REMOTE CONTROL BALL EJECTOR with the understanding that the opposite side elevational is the same.
Figure 2:
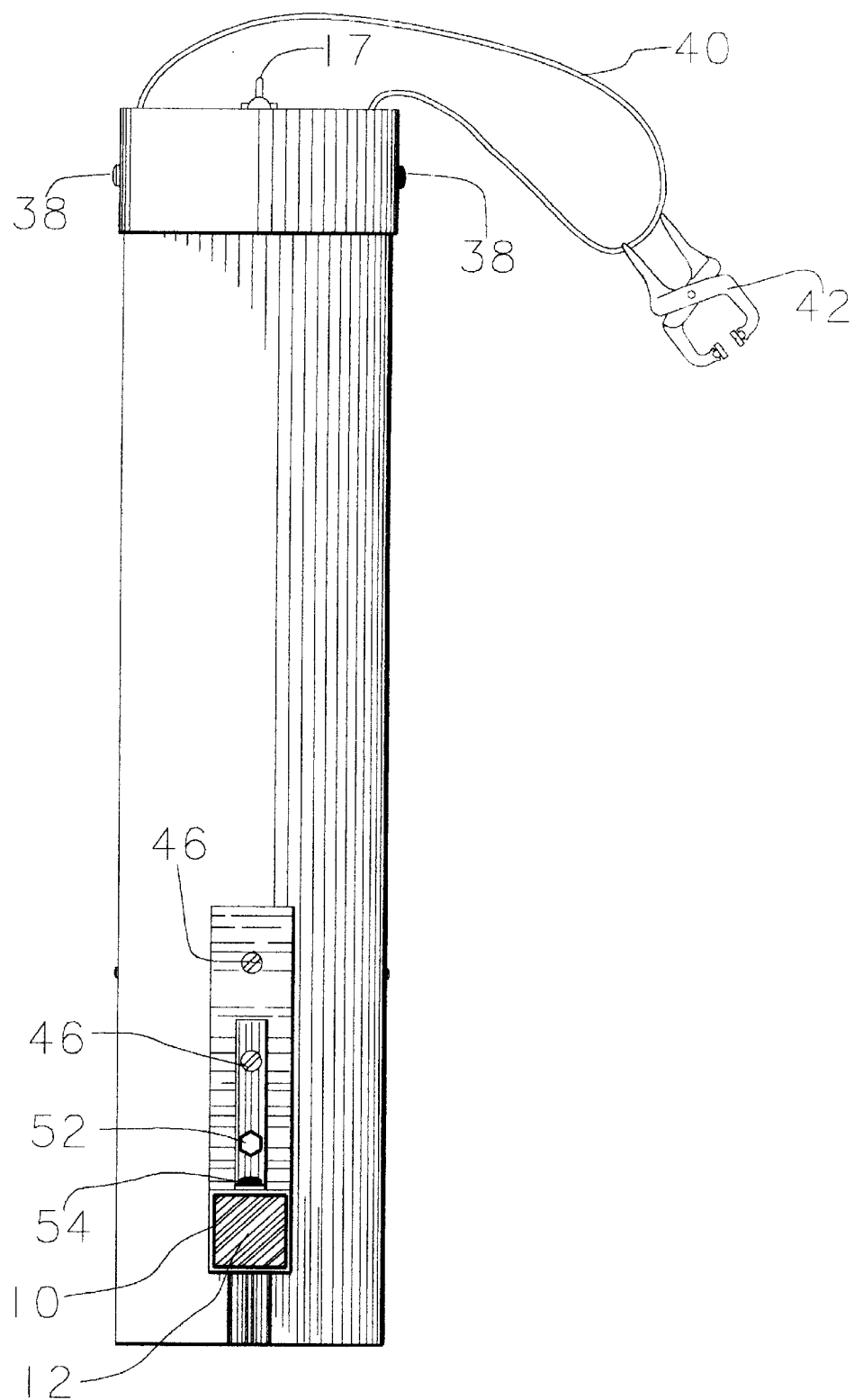
FIG. 2 is a die elevational view rotated approximately forty five degrees from the view of FIG. 1.
Figure 3:
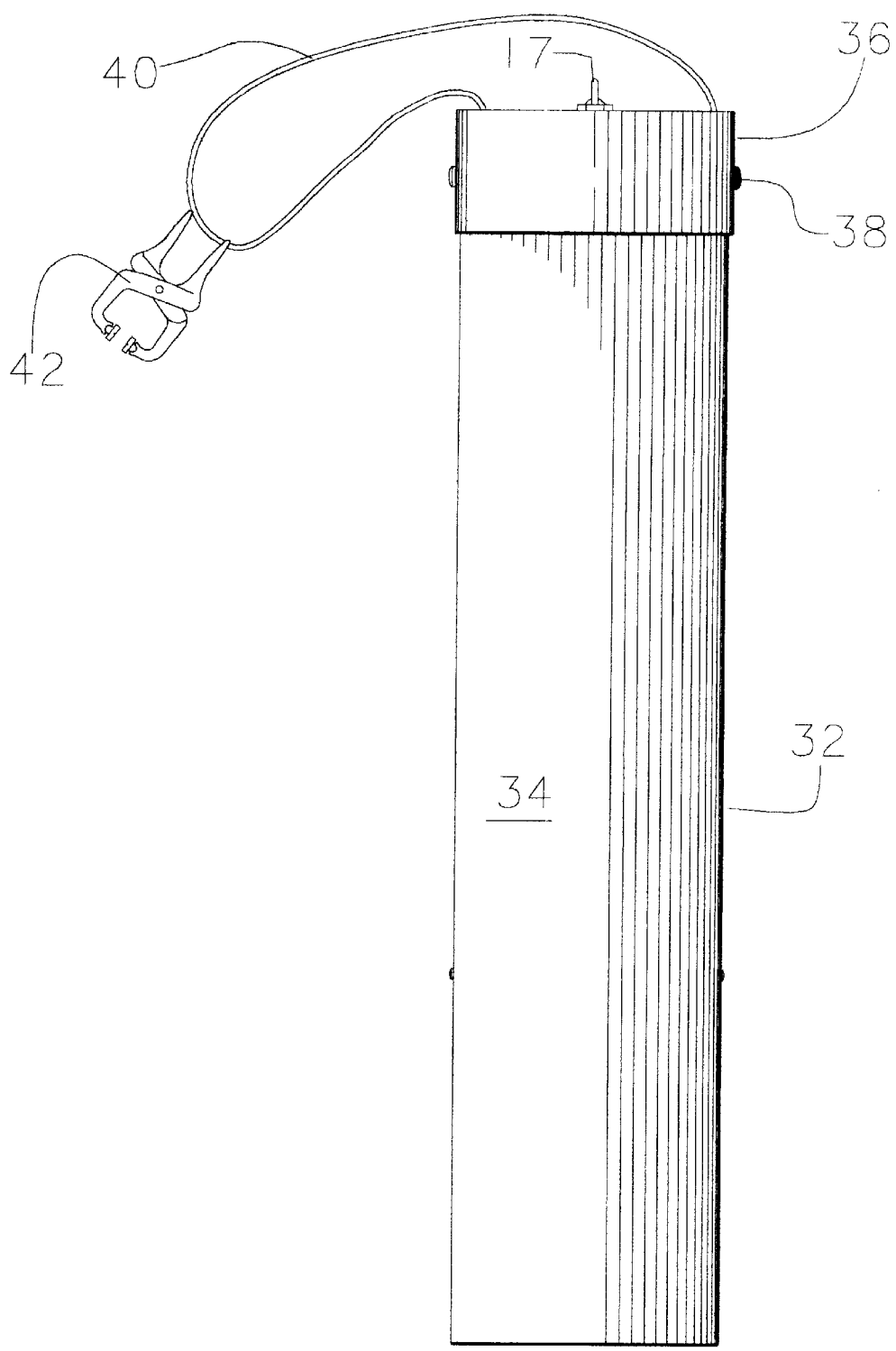
FIG. 3 is a side elevational view rotated approximately ninety degrees from the view of FIG. 2.
Figure 4:
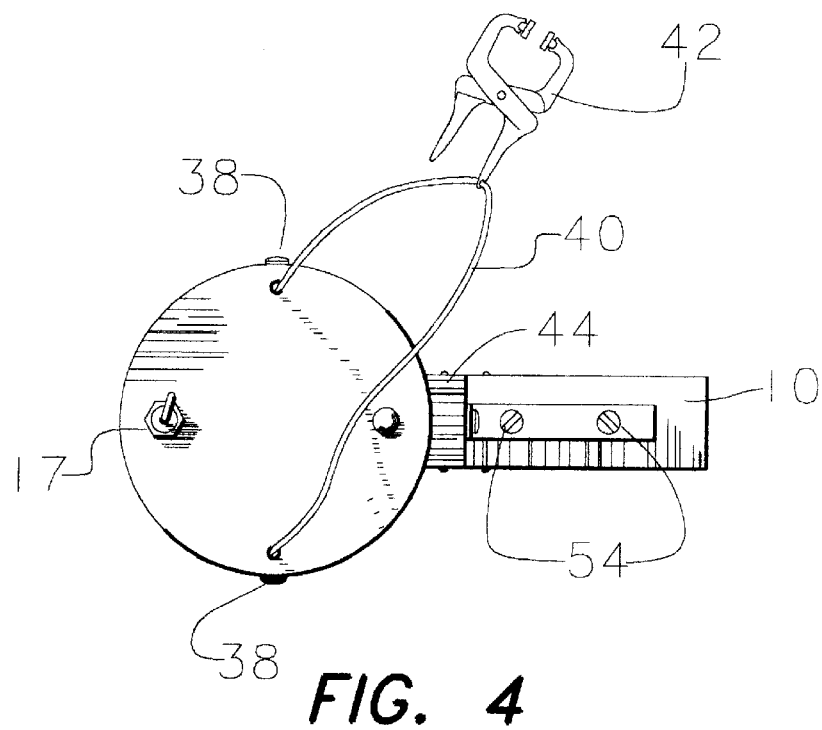
FIG. 4 is a top plan view.
Figure 5:
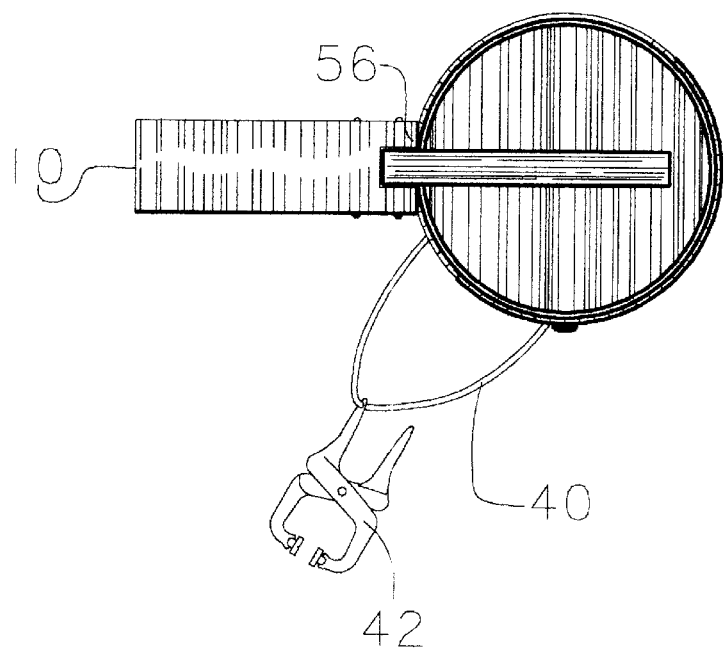
FIG. 5 is a bottom plan view.
Figure 6:
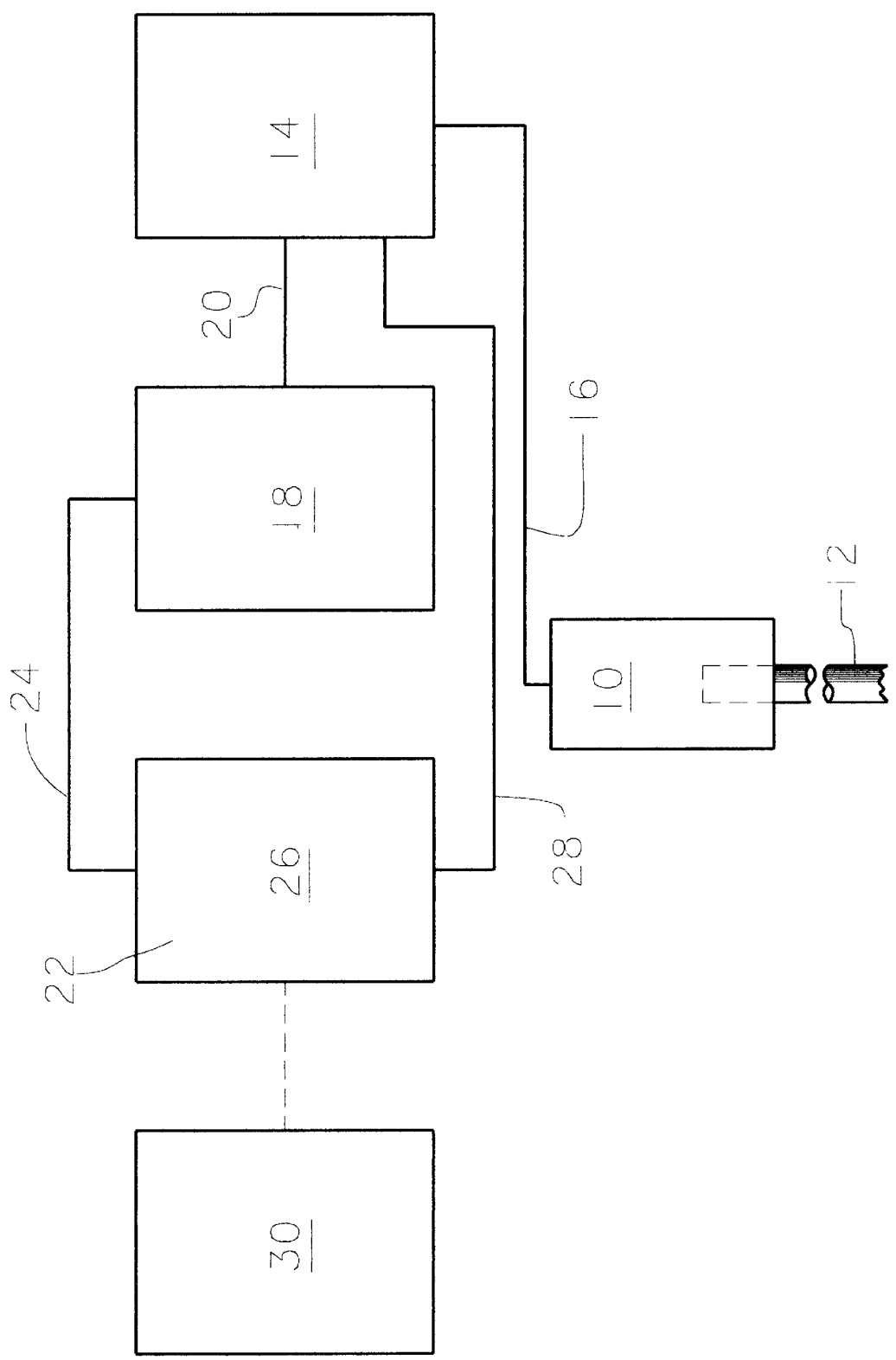
FIG. 6 is a block diagram of the invention and identifies the various parts of the invention.

With respect to FIG. 1 it is seen that there is a solenoid 10 having a movable plunger barrier 12.

There is a solenoid driver board 14 connecting with the solenoid 10 by means of the control cable 16.

There is a receiver 18 connecting with the solenoid driver board 14 by means of a cable 20.

There is battery pack comprising a 3-volt battery pack 22 which connects with the receiver 18 by means of a cable 24.

There is a 15-volt battery pack 26 which connects with the solenoid driver board 14 by means of a cable 28.

There is a remote transmitter 30 for controlling the 3-volt battery pack 22 and the 15-volt battery pack 26. The 15-volt battery pack 26 connects with the solenoid driver board 14 by means of a cable 28.

The remote transmitter 30 controls the 3-volt battery pack 22 and the 15-volt battery pack 26.

Assume that the movable plunger barrier 12 is extended. With the movable plunger barrier 12 extended said object and/or said ball will not move away from the container as the plunger is a barrier to movement. Therefore, the said object and/or said ball will stay in the container. The trainer is positioned away from the solenoid 10. The trainer can actuate the remote transmitter 30. The remote transmitter 30 controls the 3-volt battery pack 22 which controls the receiver.

The remote transmitter 30 also controls the 15-volt battery pack 26 which connects with the solenoid driver board 14.

With the trainer controlling the remote transmitter 30 the trainer can actuate the remote transmitter 30 so that the receiver 18 is energized and also the solenoid driver board is energized to retract the movable plunger barrier 12 with the movable plunger barrier moved. This allows said object and/or said ball to move away from the container so that the dog can mouth the ball and/or said object as a reward.

The trainer is remotely positioned from the solenoid 10. With said object and/or said ball released from the container, with the movement of the movable plunger barrier 12, the dog can mouth said object and/or said ball. In the dog's mind there is no association between the trainer at a remote position from the solenoid 10. The dog associates said object and/or said ball by itself and free from the trainer.

After repetition of such exercises the dog acts independently with said object and/or said ball and by odor recognizes that said object and/or said ball contains the subject under investigation such as marijuana, cocaine, heroine, gun powder, certain foods, and clothes of an individual.

A small child may wander away in a remote area or in an area with shrubs and brush. It may be difficult for people to find that small child in the shrub and brush area. By getting an article of clothing or the like the dog can be trained in regard to that scent and be set loose to try and find the small child in the area of shrubs and brush.

It is seen that there is no physical connection between the remote transmitter 30 and the solenoid 10.

There is a container 32 for housing the ball and the plunger. The container 32 may be a clyndrical tube 34 or a long tube. The container 32 may be plastic such as a vinyl tube or may be a metal tube such as aluminum or steel.

On the upper end of the cylindrical tube 34 there is a cylindrical cap 36 for enclosing the object such as a ball.

There is a screw for attaching the cap 36 to the cylindrical body 34.

There is a loop of material 40, such as a leather lace or a metal lace, for ease of carrying the container 32. On trhe loop 40 there is a clamp 42 to assist in attaching the container to a support.

On the lower end of the container 32 there is a support 44 attached to the container by screws 46, 50 and 52. A right angle brace 48 is attached to the support 44 by means of screws 50 and 52. A solenoid 10 is attached to the right angle brace 48 by means of 54. There is a passageway 56 in the side of the container 32 for allowing movement of the plunger 12.

There may be a ball 58 in the container 32 and resting on the plunger 12.

On the upper outer surface of the cap 36 there may be a switch 17 opening and closing the electric circuit for activating the plunger 12.

An apparatus for controlling the release of an object, said apparatus comprising a combination of a solenoid and a moveable plunger; said plunger restricts the movement of said object; a control unit for controlling said solenoid and the position of said plunger; said control unit and said solenoid physically connecting; a transmitter of electromagnetic waves for activating said control unit; and said transmitter and said control unit being physically separated.

An apparatus for controlling the release of an object, said apparatus comprising a combination of a solenoid and a moveable plunger; said plunger restricts the movement of said object; a control unit for controlling said solenoid and the position of said plunger; said control unit and said solenoid physically connecting; a transmitter of electromagnetic waves for activating said control unit; said transmitter and said control unit being physically separated; said control unit comprising two battery packs identified as a lower voltage battery pack and a higher voltage battery pack; said two battery packs -are responsive to said electromagnetic waves from said transmitter; the lower voltage battery pack operatively connects with a receiver; the receiver operatively connects with a solenoid driver board; the solenoid driver board operatively connects with said solenoid and said movable plunger; and the higher voltage battery pack operatively connects with said solenoid driver board.

The combination of an object and an apparatus for controlling the position of said object, said apparatus comprising a combination of a solenoid and a movable plunger; said plunger restricts the movement of said object; a control unit for controlling said solenoid and the position of said plunger; said control unit and said solenoid physically connecting; a transmitter of electromagnetic waves for activating said control unit; said transmitter and said control unit being physically separated; and said object may have a distinctive odor which a dog may recognize and acknowledge by barking and by the dog's movements.

The combination of an object and an apparatus for controlling the position of said object, said apparatus comprising a combination of a solenoid and a moveable plunger; said plunger restricts the movement of said object; a control unit for controlling said solenoid and the position of said plunger; said control unit and said solenoid physically connecting; a transmitter of electromagnetic waves for activating said control unit; said transmitter and said control unit being physically separated; said object may have a distinctive odor which a dog may recognize and acknowledge by barking and by the dog's movements; said control unit comprising two battery packs identified as a lower voltage battery pack and a higher voltage battery pack; said two battery packs are responsive to said electromagnetic waves from said transmitter; the lower voltage battery pack operatively connects with a receiver; the receiver operatively connects with a solenoid driver board; the solenoid driver board operatively connects with said solenoid and said movable plunger; and the higher voltage battery pack operatively connects with said solenoid driver board.

A method for training a dog to recognize a distinctive odor, said method comprising selecting a first object with said distinctive odor and confining said first object so that said dog cannot hold and control said first object; allowing said dog to sniff and smell said first object and allowing said dog to demonstrate that the dog knows that there is said distinctive odor; and from a distance remote from said dog and said first object allowing said first object to become available to said dog so that said dog can become adjacent to said first object.

A method for training a dog to recognize a distinctive odor, said method comprising selecting a first object with said distinctive odor and confining said first object so that said dog cannot hold and control said first object; allowing said dog to sniff and smell said first object and allowing said dog to demonstrate that the dog knows that there is said distinctive odor; from a distance remote from said dog and said first object allowing said first object to become available to said dog so that said dog can become adjacent to said first object; selecting a second object free from said distinctive odor and confining said second object so that said dog cannot hold and control said second object; and allowing said dog to sniff and smell said second object and allowing said dog to demonstrate that the dog knows that there is no said distinctive odor associated with said second object.

DRAWINGS

FIG. 1 accompanies this utility patent application.
What I claim is:
1. An apparatus for training an animal to recognize an object positioned away from an animal trainer to preclude the animal associating said animal trainer and said object, said apparatus comprising:

a. a receptacle for housing said object;
b. a movable plunger connecting with said receptacle to restrict the movement of said object in said receptacle;
c. a solenoid operatively connecting with said plunger for moving said plunger to allow said object to move;
d. a control unit for controlling said solenoid and the position of said plunger;
e. said control unit and said solenoid physically connecting;
f. a transmitter of electromagnetic waves for activating said control unit;
g. said transmitter and said control unit being remotely positioned with respect to each other so that the animal does not associate the object with an animal trainer operating the transmitter.

2. An apparatus according to claim 1 and comprising:
a. said control unit comprising two battery packs identified as a lower voltage battery pack and a higher voltage battery pack;
b. said two battery packs being responsive to said electromagnetic waves from said transmitter;
c. the lower voltage battery pack operatively connects with a receiver;
d. the receiver operatively connects with a solenoid driver board;
e. the solenoid driver board operatively connects with said solenoid and said movable plunger; and
f. the higher voltage battery pack operatively connects with said solenoid driver board.

3. An apparatus according to claim 1 and comprising:
a. said transmitter and said control unit being separate and distinct from each other.

4. An apparatus according to claim 2 and comprising:
a said transmiter and said control unit being separate and distinct from each other.

5. The combination of an object and an apparatus for controlling the position of said object:
a. said apparatus comprising a combination of a receptacle for said object, a solenoid and a moveable plunger controlled by said solenoid and associated with said receptacle;
b. said moveable plunger restricts the movement of said object in said receptacle;
c. a control unit for controlling said solenoid and the position of said plunger in said receptacle;
d. said control unit and said solenoid physically connecting;
e. a transmitter of electromagnetic waves for activating said control unit;
f. said transmitter and said control unit being physically separated; and,
g. said object may have a distinctive odor which a dog may recognize and acknowledge by barking and by the dog's movements.

6. A combination according to claim 5 and comprising:
a. said control unit comprising two battery packs identified as a lower voltage battery pack and a higher voltage battery pack;
b. said two battery packs are responsive to said electromagnetic waves from said transmitter;
c. the lower voltage battery pack operatively connects with a receiver;
d. the receiver operatively connects with a solenoid driver board;
e. the solenoid driver board operatively connects with said solenoid and said movable plunger; and
f. the higher voltage battery pack operatively connects with said solenoid driver board.

7. An apparatus according to claim 5 and comprising:
a. said transmitter and said control unit being separate and distinct from each other.

8. An apparatus according to claim 6 and comprising:
a. said transmitter and said control unit being separate and distinct from each other.

\* \* \* \* \*